Jan. 23, 1951        R. C. FERGASON        2,538,748

TRACTOR AND IMPLEMENT ASSEMBLY

Filed Aug. 29, 1946        3 Sheets-Sheet 1

INVENTOR
Rector L. Fergason
BY
ATTORNEY

Jan. 23, 1951 R. C. FERGASON 2,538,748
TRACTOR AND IMPLEMENT ASSEMBLY
Filed Aug. 29, 1946 3 Sheets-Sheet 2

INVENTOR
Rector C. Fergason
BY J. J. Kane
ATTORNEY

Jan. 23, 1951  R. C. FERGASON  2,538,748
TRACTOR AND IMPLEMENT ASSEMBLY
Filed Aug. 29, 1946  3 Sheets-Sheet 3

INVENTOR
Rector C. Fergason
BY
J. J. Kane
ATTORNEY

Patented Jan. 23, 1951

2,538,748

UNITED STATES PATENT OFFICE 2,538,748

TRACTOR AND IMPLEMENT ASSEMBLY

Rector C. Fergason, La Porte, Ind., assignor to Allis-Chalmers Manufacturing Company, Milwaukee, Wis., a corporation of Delaware Application August 29, 1946, Serial No. 693,712

8 Claims. (Cl. 56—11)

This invention relates in general to tractors and tractor mounted implement assemblies, and it has more particular relation to the mounting of implements on tractors in a manner that will satisfactorily take care of certain construction and performance requirements, such as convenience of assembly and disassembly, and maintenance of implements in desired operating relation under operating conditions incident to travel of the tractor over uneven ground.

While the practice of detachably mounting implements on tractors is quite old and well-known, it has become desirable to so mount certain classes of implements, particularly such as are used for harvesting or crop gathering, as in the case of cotton harvesting or gathering implements, on a tractor in a manner which will provide for satisfactorily maintaining the implement in desired position as the tractor advances over ground of uneven surface contour; and it is particularly desirable to be able to effect this result in a tractor-implement combination in which the tractor part includes the main frame, the power plant, and drive mechanism of a conventional type tractor.

Generally, the present invention is directed toward and has for an object the provision of an improved tractor and implement assembly wherein the hereinabove referred to and other desirable features and advantages are attained in a simple manner, and one which affords facility in converting the tractor to and from a conventional tricycle type tractor and a four wheeled type tractor.

Another object of the invention is to provide an improved tractor and implement assembly of the character set forth hereinbefore incorporating a flexibly constructed and mounted front steering truck which will enable the tractor part of the combination to adjust itself to irregularities of the ground surface without undue strain.

A further object of the invention is to provide a tractor and implement assembly incorporating a flexibly constructed and mounted wide tread front steering truck and an implement unit, or a plurality of such units, supported in part on the main frame of the tractor and in part on said steering truck and in such a manner that the implement unit or units will be maintained in desired relation to the ground as the tractor advances over ground of uneven surface contour.

A further object of the invention is to provide an improved front wheel and implement mount ing structure for use in a tractor and implement assembly, and which mounting structure will be adapted to carry either one implement unit, for one-row operation, at one side of the main frame of the tractor, or to carry two implement units, for two-row operation, at opposite sides of the main frame of the tractor.

A further object of the invention is to provide an improved adjustable and detachable mounting for crop gathering implements on a tractor, permitting controlled adjustment of the implement in a vertical direction.

These and other advantages are attained by the present invention, various novel features of which will be apparent from the description herein and the accompanying drawings disclosing an embodiment of the invention, and will be more particularly pointed out in the accompanying claims.

Referring to the accompanying drawings:

Fig. 4 is a partial side elevation of a narrow tread front steering truck;

Fig. 5 is a front elevation of the structure shown in Fig. 4;

Fig. 6 is an enlarged view taken on line VI—VI of Fig. 1 with the steering links and the offside wheel assembly removed; and Fig. 7 is a front elevation of the structure shown in Fig. 6.

Figure 1:
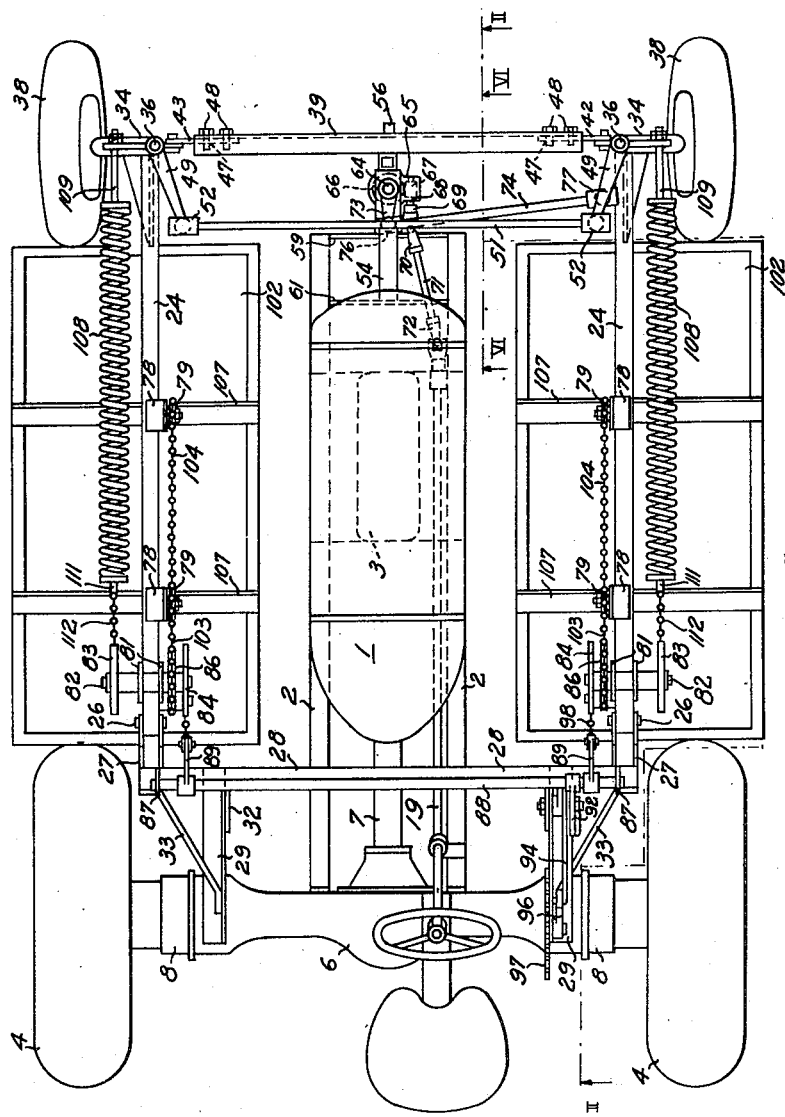
Fig. 1 is a top plan view of a tractor-implement combination embodying the invention.
Figure 2:
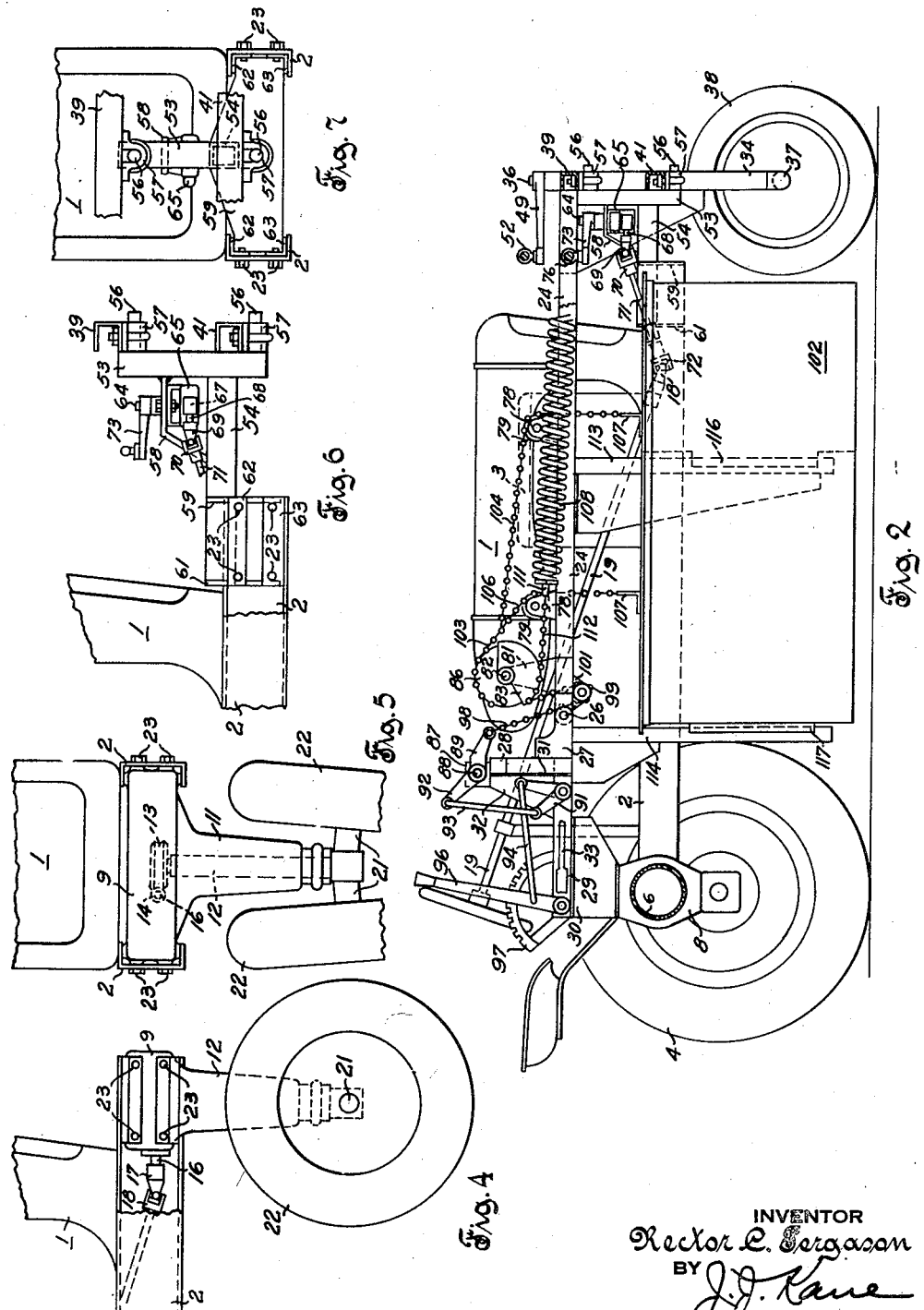
Fig. 2 is a view of the combination taken on line II—II of Fig. 1.
Figure 3:
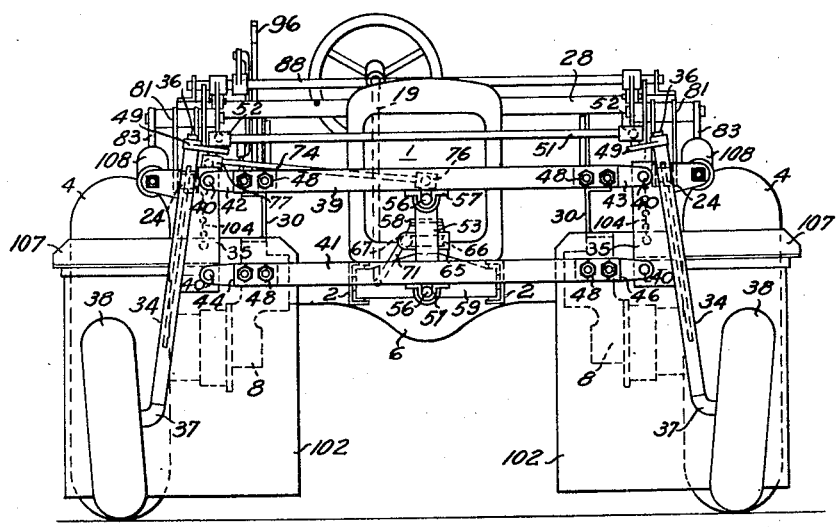
Fig. 3 is a front elevation of the combination shown in Fig. 1.

Referring to the drawings, the reference character I generally denotes the tractor part of the illustrated tractor-implement combination, said tractor part, as shown in Figs. 1, 2 and 3, comprising the main frame and the power driven rear wheels of a well-known type of tractor which is disclosed, for instance, in U. S. Patent 2,073,613, dated March 16, 1937, and granted to C. E. Frudden and W. F. Strehlow for Motor Vehicle.

Briefly, the main frame of the tractor comprises opposite side channels 2, on which are mounted an engine unit 3 and the usual control accessories, not shown. The power driven rear wheels of the tractor are indicated at 4, and an upwardly arched rear axle structure mounting said rear wheels comprises an intermediate portion 6 enclosing a differential drive, driven from the engine through the usual transmission including a shaft enclosed in a tube 7, and depending final drive casings 8 enclosing gearing connecting the differential drive with the traction wheels 4.

The side channels 2 of the main frame of the tractor project forwardly beyond the engine 3, and the forwardly projecting portions of the side channels are adapted for interchangeable connection either with a narrow tread type of front steering truck such as shown in Figs. 4 and 5, having a pair of closely spaced steerably mounted wheels 22, or with a wide tread type of front steering truck such as shown in Figs. 1, 2 and 3, having a pair of widely spaced steerably mounted wheels 38.

Considering first the front steering truck shown in Figs. 4 and 5, said truck comprises a pedestal structure including a generally rectangular hollow portion 9 slidably positionable between forward end portions of the side channels 2 of the tractor frame, and in supporting relation with respect to the upper opposed flanges on such channels and having a vertically depending hollow post 11. A spindle 12 extends upwardly through and is turnably carried by post 11 with its upper end disposed within hollow pedestal portion 9. The upper end of spindle 12 is provided with a worm gear 13 in mesh with a worm 14 carried by a shaft 16 rotatably mounted within hollow pedestal portion 9. The rear end of shaft 16 is provided with a universal coupling element 17 detachably connected with a complementary element 18 carried by the adjacent forward end of a rotatably mounted steering rod or shaft 19 extending rearward and upward to a point within easy reach of the operator's station on the tractor. The lower end of spindle 12 is provided with a pair of oppositely extending axle portions 21 and a ground engaging supporting wheel 22 is rotatably mounted on each of said axle portions. The pedestal portion 9 is detachably secured to the side channels 2 by means of cap screws 23 which extend through the webs of the channels and into tapped holes of the pedestal portion 9. The entire front steering truck can be readily removed as a unit from the main frame of the tractor. That is, upon jacking or blocking up the front end portion of the tractor frame and then disconnecting universal coupling elements 17 and 18 and removing bolts 23, the pedestal structure can be moved forward as a unit to withdraw rectangular portion 9 from between the channels 2.

Instead of supporting the front end of the tractor frame on a narrow tread steering truck such as shown in Figs. 4 and 5, said steering truck may be bodily removed as a unit, as hereinabove pointed out, and for the purposes of the present invention the front end of the tractor frame is supported on a substitute or interchangeable, removable wide tread steering truck carrying widely spaced wheels and affording structural and attachment features for accommodating the support of implements, such as crop gathering mechanism.

Referring particularly to Figs. 1, 2, 3, 6 and 7, the above mentioned substitute wide tread steering truck comprises a pair of elongated rigid side frame members 24 disposed to extend longitudinally of the main frame of the tractor at opposite sides, respectively, of the latter and in generally parallel relation to each other. The side frame members 24 are connected at their rear ends with the main frame of the tractor for up and down swinging movement relative thereto, and for that purpose of an auxiliary support to which the side frame members 24 are pivoted by means of pivot pins 26, is mounted on the tractor main frame at the rear end of the latter, as best shown in Figs. 1 and 2.

The rear auxiliary support comprises a pair of supporting brackets 27 for the pivot pins 26, an elevated cross member 28 connecting the brackets 27, extensions 29 projecting rearwardly from the brackets 27, respectively, and mounting brackets 30 which are rigidly secured to the main frame at opposite sides, respectively, of a rearward portion of the latter, the brackets 30 being bolted on top of the final drive casings 8 at the axially opposite ends of the upwardly arched rear axle structure of the tractor. The extensions 29 are secured to and extend forwardly from the mounting brackets 30, and the forward end portion of each extension 29 is rigidly supportingly united with the cross member 28 through vertically extending post and gusset plate elements 31 and 32, respectively. If desired, brackets 27 may each be additionally braced by means of a rigid member 33 connecting same with a rearwardly spaced side portion of the adjacent extension 29.

The forward end portion of each side frame member 24 is provided with a depending sleeve member 34, and turnably mounted in each sleeve member 34 is a steering spindle 36. Rotatably mounted on a lower axle portion 37 of each steering spindle 36 is a ground engaging supporting wheel 38. As best shown in Fig. 3, plate portions 35 are rigidly secured to the sleeve members 34 at the relatively opposed sides of the latter, and are connected with each other by parallel rigid upper and lower links 39 and 41. The upper link 39 comprises a main section and end sections 42 and 43 which are adjustable longitudinally of the main section and retained in adjusted position by means of bolts 48 extending through holes 47 (Fig. 1). The lower link 41 is similarly constructed, its adjustable ends being shown at 44 and 46. Each of the upper and lower links 39, 41 is pivotally connected at its opposite ends with the adjacent plate portions 35 through pivot pins 40 which, as shown in Figs. 2 and 3, extend horizontally and in the longitudinal direction of the tractor through the end sections of the respective links and through the plate portions 35 adjacent to said end sections.

The upper ends of spindles 36 are each provided with a laterally projecting arm 49, and outer end portions of the arms 49 are interconnected through a link 51 and conventional ball and socket connections 52 insuring similar simultaneous movements thereof.

The mid portions of links 39 and 41 are pivotally connected with a stationary vertically extending bracket part 53 which is rigidly connected with a horizontal bracket member 54 extending forwardly from the main frame of the tractor. The vertical bracket part 53 carries vertically spaced pivot pins 56 which extend forwardly therefrom, and these pins are supportingly embraced by bearings 57 on links 39 and 41, respectively. A brace 58 rigidly unites an upper rear side portion of bracket part 53 with a rearwardly spaced top side portion of bracket member 54. The rear end portion of member 54 is rigidly united with a pair of spaced parallel transverse plates 59 and 61 having top and bottom side edge portions rigidly united by angle bars 62 and 63 forming a generally rectangular box-like structure slidably positionable between the front end portions of side channels 2 in supporting relation thereto and in substantially the same manner as previously pointed out herein with respect to rectangular top portion 9 of the narrow tread front steering truck. The above mentioned box-like rigid structure of the wide tread front steering truck is detachably secured to the front end of the tractor by inserting the bolts 23 through holes in the angle members 62 and 63 alignable with the holes in channel members 2.

Considering the upper and lower links 39 and 41 of the wide tread steering truck at the front end of the tractor as transverse spacing means between the side frame members 24, it will be noted that said spacing means are supportingly connected with said side frame members and with the tractor main frame, and are operative to accommodate up and down swinging movement of the side frame members 24 relative to the tractor main frame about the pivot pins 26. Considering further one of the links, say the lower one 41, as a transverse connecting member between the side frame members 24, it will be noted that the other or upper link 39 functions to stabilize the side frame members 24 against torsional displacement about their longitudinal axes. The two pivot pins 40 through which the upper link 39 is connected at its opposite ends to the side frame members 24, respectively, by means of the plates 35 and sleeve members 34, are spaced from the corresponding pivot pins 40 of the lower link 41 the same vertical distance as the horizontal parallel axes of the pivot pins 56 on the stationary bracket part 53. This arrangement permits free swinging movement of the links 39 and 41 in parallel relation to each other about the axes of the upper and lower pivot pins 56, respectively, incident to up and down movement of the side frame members 24 relative to the tractor main frame about the pivot pins 26.

A vertical shaft 64 is rotatably supported in a suitable housing 65 disposed beneath and carried by brace 58, and shaft 64 extends upward through brace 58 and may be in part suitably supported by a bearing or the like mounted therein. The portion of shaft 64 enclosed within housing 65 is provided with a worm gear 66 in mesh with a worm 67 on the forward end portion of a shaft 68 rotatably mounted within the lower portion of housing 65. The rear end of shaft 68 is provded with a universal coupling element 69 detachably connected with a complementary element 70 on the adjacent forward end of an extension shaft 71. The rear end of extension shaft 71 is provided with a universal coupling element 72 detachably connected with the complementary element 18 on the forward end of steering shaft 19. The upper end of shaft 64 is provided with an arm 73 connected with the arm 49 of one of the spindles 36 through a link 74 and ball and socket connections 76 and 77.

An intermediate portion of each side frame member 24 is provided with a pair of longitudinally spaced brackets 78 each mounting a sprocket wheel 79, with the sprocket wheels carried by each pair of members disposed in longitudinal alignment. Each side frame member 24 further carries, near its rear end, an additional bracket 81 which extends to a greater height than the brackets 78 and rotatably mounts a spool member 82 comprising end sprocket segments 83 and 84 and an intermediate sprocket segment 86 aligned with the sprockets 79 carried by brackets 78. Cross member 28 also mounts longitudinally spaced brackets 87 rotatably supporting an overlying transverse rock shaft 88 provided with a pair of longitudinally spaced forwardly projecting arms 89 aligned with the sprocket segments 84 of spool members 82. The rearward extension 29 of one of the brackets 27 pivotally supports a bell crank lever 91, and the rock shaft 88 has a rearwardly projecting arm 92 thereon aligned with an arm of bell crank lever 91 and connected therewith through a link 93. The other arm of bell crank lever 91 is connected through a link 94 with a hand lever 96 disposed within easy reach of the operator's station on the tractor and being operatively associated with a serrated quadrant 97 for retaining the lever in any selected one of a plurality of pivotally adjusted positions.

Secured to the free ends of arms 89 are chains 98 or similar flexible power transmitting elements through which the rock shaft 88 is operatively connected with the spool members 82. Each chain 98 passes from the free end of its respective arm 89 around the underside of an aligned idler sprocket 99, a bracket 101 mounting the sprocket 99 being secured to the adjacent end of the respective side frame member 24. From the sprockets 99 the chains 98 pass over the sprocket segments 84, respectively, of the spool members 82, and the latter are operatively connected with the chains 89, respectively, each chain being suitably anchored on its associated sprocket segment 84.

A harvesting apparatus or implement unit 102 which, for instance, may be a cotton picking unit of well-known construction, is supportingly connected with each side frame member 24 in vertically adjustable relation thereto by means of a chain 103 or similar power transmitting element. The chain 103 is secured to and passes over sprocket segment 86 and terminates in branches 104 and 106 which pass over sprockets 79. The branches 104 and 106 extend downward from the sprockets 79 and are connected with a pair of longitudinally spaced brackets 107 mounted on the top side of implement unit 102 in generally vertical alignment with the sprockets 79. The weight of each implement unit is preferably counter-acted or balanced by a spring 108 disposed longitudinally of the respective side frame member 24 and in alignment with sprocket segment 83, the spring 108 having its forward end secured to a bracket on sleeve 34 at the forward end of the respective side frame member 24 through a suitable connector 109. The rear end of each spring 108 is tensionably secured to the respective sprocket segment 83 through a connector 111 and a chain 112. Each side member 24 and the bracket 27 aligned therewith are preferably provided with depending suitably braced guide post structures 113 and 114, respectively, slidably engaged by slotted implement mounted guide members 116 and 117.

Implement unit 102 is shown in Fig. 2 as spaced above the ground line, and from the foregoing description, it will be apparent that both implement units can be simultaneously vertically adjusted relative to the ground and relative to their respective supporting beams 24 simply by rocking lever 96. In this connection, the coordination of parts is such that if lever 96 is swung from the position shown to its extreme forward position, implement unit 102 will rest firmly on the ground thus permitting the chain branches 104 and 106 to be disconnected from brackets 107. And since the only other connections between the implement units 102 and beams 24 herein shown is afforded by the guide post structures 113, 114 and the guide members 116, 117 coacting therewith, the removal of the guide post structures or of both the guide post structures and guide members will permit each implement 102 to be bodily removed laterally from between the generally aligned front and rear wheels 38 and 4. If the implement unit 102 is of a type which includes power driven elements operatively connected with a power take-off element (not shown) of the tractor, a separable connection between such elements may be provided in order to permit the mentioned removal of the implement units from the tractor.

Referring to Figs. 1 and 2, it will be noted that the implement units 102 are of relatively great length, longitudinally of the tractor, and that the necessary elongation of the wheel base of the tractor which permits positioning of the relatively long implement units in the spaces between the front and rear wheels at opposite sides of the tractor main frame, as best shown in Fig. 2, is obtained by means of the wide tread front steering truck, and more particularly by the provision of the elongated bracket member 54 which extends forwardly from the main frame of the tractor. Referring to Figs. 1 and 3, it will further be noted that the implement units 102 extend transversely of the tractor into the space between the tread lines of the front and rear wheels so that they may work on two plant rows which are straddled by the tractor. As the tractor is propelled along the two plant rows its wheels are subject to rise and fall due to irregularities of the ground, and the flexible construction of the wide tread front steering truck and its flexible connection with the main frame, which have been explained hereinbefore, will enable the tractor to accommodate itself to said irregularities of the ground without undue strain. The suspension of the implement units 102 from the side frame members or implement supporting beams 24 in the manner described hereinbefore will be effective to protect the implement units from accidental contact with the ground and from consequent damage while the tractor is being driven over uneven ground with the implement units lowered to their operative positions. More particularly, the disclosed mounting and suspension of the implement units subjects the latter to a substantially vertical parallel lift as the tractor passes over uneven ground. At the same time, the front wheels 38 will be maintained at substantially the same angular relationship relative to the horizontal, due to the action of the parallel link mechanism including the upper and lower links 39 and 41.

In the disclosed mounting and suspension of the implement units the weight of the latter is transmitted, at least in part, from the side frame members 24 directly to the sleeve members 34 of the front steering truck. Such a distribution of the weight of the implement units is desirable where the units are relatively bulky and heavy, such as cotton picking units which involve a great number of parts.

While the tractor-implement combination as shown in Figs. 2 and 3 includes two implement units, that is, one at each side of the tractor, it should be noted that the disclosed construction of the tractor part of the combination is such that it can be used selectively with either one or with both implement units, depending on whether it is desired to work on only one crop row or simultaneously on two crop rows.

If desired, the wide tread front steering truck comprising the wheels 38, parallel links 39, 41, and associated parts may be removed from the tractor main frame, and the narrow tread front steering truck shown in Figs. 4 and 5 may be substituted therefor. Such a substitution may be readily effected by jacking or blocking up the front end portion of the tractor frame, by disconnecting chain 98 from either sprocket segment 84 or arm 89, by removing pivot pins 26, by disconnecting coupling element 72 on extension shaft 71 from coupling element 18 on steering shaft 19, and then removing bolts 23 from frame channels 2, whereupon the entire wide tread steering truck can be rolled forward thereby sliding the rigid supporting structure comprising bracket member 54, rear bracket plates 59, 61 and angle bars 62, 63 from between the side channels 2 of the tractor main frame. If a suitable wheel supported jack is available, the actual separation of the tractor main frame from the wide tread steering truck may be effected, once the forward end of the tractor is supported on such a jack and the various elements and parts disconnected or removed as pointed out above, simply by blocking the front wheels 38 and by backing the tractor (the wheeled jack supporting the front end of the tractor moving therewith) away therefrom. In either case, the implements 102 may be first removed, if desired, as hereinbefore described.

After the wide tread front steering truck has been removed from the tractor main frame, the narrow tread front steering truck shown in Figs. 4 and 5 may be readily attached thereto in the obvious manner, and the blocks or jack removed, thereby reconverting the tractor to a conventional tricycle type.

The wide tread front steering truck disclosed herein may be utilized either with or without implements mounted thereon and in addition may be of a form differing in numerous structural respects from that herein shown and described for purposes of illustration. And it should be understood that it is not intended to limit the invention to the exact constructions and combinations herein disclosed as various modifications within the scope of the appended claims may occur to persons skilled in the art.

It is claimed and desired to secure by Letters Patent:

1. In combination with the main frame and the power driven rear wheels of a tractor, a pair of side frame members extending longitudinally of said main frame at opposite sides, respectively, of the latter, pivot means connecting said side frame members at their rear ends, respectively, with said main frame for up and down movement of said side frame members relative to said main frame, ground engaging front wheels connected, respectively, with said side frame members in steerable and load sustaining relation thereto, upper and lower transverse spacing members positioned between forward portions of said side frame members, means mounting said spacing members intermediate their ends on said main frame for rocking movement relative thereto about upper and lower horizontal axes, respectively, means pivotally connecting said upper and lower spacing members with said side frame members at points spaced vertically on each of said side frame members substantially the same distance from each other as said upper and lower horizontal axes; an implement unit disposed in the space between said front and rear wheels at one side of said main frame, and means supportingly connecting said implement unit with the side frame member at said one side of said main frame.

2. In combination with the main frame and power driven rear wheels of a tractor, a pair of side frame members extending longitudinally of said main frame at opposite sides, respectively, of the latter, means connecting said side frames at their rear ends, respectively, with said main frame for up and down swinging movement of said side frame members relative to said main frame, depending sleeve members attached to the front ends of said side frame members, each of said sleeve members rotatably mounting a spindle member, each of said spindle members rotatably mounting a steerable front ground engaging wheel in load sustaining relation to said side frame members, transverse load transmitting spacing means positioned between said sleeve members and comprising a pair of normally horizontally extending parallel links pivotally attached at the opposite ends thereof to said sleeve members, a vertically extending bracket part attached to the front end of said tractor and having a pair of spaced pivot pins lying in a vertical plane including therein the longitudinal axis of said tractor, said parallel links being pivotally mounted at the midportions thereof on said pivot pins in supporting relation to the front end of said tractor, an implement unit disposed in the space between said front and rear wheels at one side of said main frame and beneath one of said side frame members, and means supportingly connecting said implement unit with respect to the side frame member at said one side of said main frame.

3. In combination with the main frame and the power driven rear wheels of a tractor, a front support for said main frame comprising a pair of front wheels, a pair of steering spindles operatively mounting said front wheels, respectively, a pair of sleeve members rotatably mounting said steering spindles, respectively, a pair of normally horizontally extending parallel links pivotally attached at the opposite ends thereof, respectively, with said sleeve members, a vertically extending bracket part attached to the front end of said tractor and having a pair of spaced pivot pins lying in a vertical plane including therein the longitudinal axis of said tractor, said parallel links being pivotally mounted at midportions thereof on said pivot pins in load sustaining and rockable relation thereto, manually operable steering means mounted on said main frame and operatively connected with said steering spindles, implement units mounted at opposite sides of said main frame, and means mounting said units between said front wheels and said rear wheels, said means comprising a pair of implement supporting beams extending longitudinally of said main frame at opposite sides, respectively, of the latter and pivotally connected at their rear ends with said main frame for up and down movement relative thereto, said implement supporting beams being supportingly connected, respectively, at their forward ends with said sleeve members.

4. In combination with the main frame and the power driven rear wheels of a tractor, a front support for said main frame comprising a pair of front wheels, a pair of steering spindles operatively mounting said front wheels, respectively, a pair of sleeve members rotatably mounting said steering spindles, respectively, at least two normally horizontally extending parallel links pivotally attached at the ends thereof to said sleeve members, vertically aligned spaced pivot pins attached to the forward end of said tractor and pivotally connected with said parallel links at midportions thereof in load sustaining rockable relation thereto; manually operable steering means mounted on said main frame and operatively connected with said steering spindles; implement units disposed at opposite sides of said main frame and mounted on means comprising a pair of implement supporting beams extending longitudinally of said main frame at opposite sides, respectively, of the latter and pivotally connected at their rear ends with said main frame for up and down movement relative thereto, said implement beams being supportingly connected, respectively, at their forward ends with said sleeve members.

5. In combination with the main frame and power driven rear wheels of a tractor, a bracket structure mounted on a forward portion of said main frame and extending forwardly therefrom, a pair of side frame members pivotally mounted on said main frame at a rearward portion thereof for up and down movement relative thereto and extending longitudinally of said main frame at opposite sides thereof beyond said forward portion of said main frame, at least two normally transversely horizontally extending parallel links with midportions of each of said links being supportingly pivotally connected with said bracket structure and with end portions of each of said links supportingly connected with forward portions of said side frame members and operative to accommodate said up and down movement of said side frame members, a pair of front wheels steerably mounted, respectively, on forward portions of said side frame members, and implement units mounted on said side frame members at opposite sides of said main frame and in the spaces between said front and rear wheels.

6. In combination with the main frame and the power driven rear wheels of a tractor, a front support for said main frame comprising a pair of front wheels, a pair of steering spindles operatively mounting said front wheels, respectively, a pair of sleeve members rotatably mounting said steering spindles, respectively, at least two normally horizontally extending parallel links pivotally attached at the ends thereof to said sleeve members, respectively, vertically aligned and spaced pivot pins attached to the front end of said tractor and pivotally connected with said parallel links at the midportions thereof in load sustaining rockable relation thereto, and steering means mounted on said main frame and operatively connected with said steering spindles.

7. In combination with the main frame and the power driven rear wheels of a tractor, a front support for said main frame comprising a pair of front wheels, a pair of steering spindles operatively mounting said front wheels, respectively, a pair of sleeve members rotatably mounting said steering spindles, respectively, a pair of normally horizontally extending parallel links pivotally attached at the opposite ends thereof, respectively, with said sleeve members, a vertically extending bracket part attached to the front end of said tractor and having a pair of spaced pivot pins lying in a vertical plane including therein the longitudinal axis of said tractor; said parallel links being pivotally mounted at the midportions thereof on said pivot pins in load sustaining and rockable relation thereto, and steering means mounted on said main frame and operatively connected with steering spindles.

8. In combination with the main frame and power driven rear wheels of a tractor, a tractor front end support comprising a pair of side frame members extending longitudinally of said main frame at opposite sides, respectively, of the latter, means connecting said side frames at their rear ends, respectively, with said main frame for up and down swinging movement of said side frame members relative to said main frame, depending sleeve members attached to the front ends of said side members, each of said sleeve members rotatably mounting a spindle member, each of said spindle members rotatably mounting a steerable front ground engaging wheel; transverse load transmitting spacing means positioned between said sleeve members and comprising a pair of normally horizontally extending parallel links pivotally attached at the opposite ends thereof to said sleeve members, a normally vertically extending bracket part attached to the front end of said tractor and having a pair of spaced pivot pins extending longitudinally in a vertical plane including therein the longitudinal axis of said tractor, said parallel links being pivotally mounted at the midportions thereof on said pivot pins in supporting relation to the front end of said tractor, and steering means mounted on said main frame and operatively connected with said steering spindles.

RECTOR C. FERGASON.

REFERENCES CITED

The following references are of record in the file of this patent:

UNITED STATES PATENTS

| Number | Name | Date |
| --- | --- | --- |
| 1,774,008 | Hester | Aug. 26, 1930 |
| 1,799,368 | Hendrickson | Apr. 7, 1931 |
| 1,824,861 | Worthington | Sept. 29, 1931 |
| 1,959,070 | Thomann | May 15, 1934 |
| 2,175,216 | Rust | Oct. 10, 1939 |
| 2,178,505 | Warneke | Oct. 31, 1939 |
| 2,244,857 | Sletten | June 10, 1941 |

FOREIGN PATENTS

| Number | Country | Date |
| --- | --- | --- |
| 827,226 | France | Apr. 21, 1938 |